(12) United States Patent
Ma et al.

(10) Patent No.: US 11,507,482 B2
(45) Date of Patent: Nov. 22, 2022

(54) RECOVERING CONSISTENCY OF A RAID (REDUNDANT ARRAY OF INDEPENDENT DISKS) METADATA DATABASE

(71) Applicant: EMC IP Holding Company LLC, Hopkinton, MA (US)

(72) Inventors: Charles Ma, Beijing (CN); Shaoqin Gong, Beijing (CN); Geng Han, Beijing (CN); Vamsi K. Vankamamidi, Hopkinton, MA (US); Shuyu Lee, Acton, MA (US); Ping Ge, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 192 days.

(21) Appl. No.: 17/153,108

(22) Filed: Jan. 20, 2021

(65) Prior Publication Data
US 2022/0229747 A1 Jul. 21, 2022

(51) Int. Cl.
*G06F 11/20* (2006.01)
*G06F 12/06* (2006.01)
*G06F 16/23* (2019.01)

(52) U.S. Cl.
CPC .......... *G06F 11/2094* (2013.01); *G06F 12/06* (2013.01); *G06F 16/2365* (2019.01); *G06F 2201/82* (2013.01); *G06F 2212/657* (2013.01)

(58) Field of Classification Search
CPC .................................. G06F 11/2094
USPC .............................. 714/6.22–6.24
See application file for complete search history.

(56) References Cited

U.S. PATENT DOCUMENTS

| | | | | |
|---|---|---|---|---|
| 6,606,629 | B1 * | 8/2003 | DeKoning | G06F 11/2069 |
| 2012/0158652 | A1 * | 6/2012 | Ps | G06F 11/1451 707/690 |
| 2016/0170871 | A1 * | 6/2016 | Hyun | G06F 3/06 711/103 |
| 2017/0269992 | A1 * | 9/2017 | Bandic | G06F 11/1048 |
| 2019/0179706 | A1 * | 6/2019 | Bono | G06F 11/1076 |
| 2020/0159621 | A1 * | 5/2020 | Velayuthaperumal | G06F 3/064 |
| 2020/0341849 | A1 * | 10/2020 | Shani | G06F 3/0689 |
| 2021/0124649 | A1 * | 4/2021 | Sasson | G06F 12/0253 |

FOREIGN PATENT DOCUMENTS

CN 111414134 B * 5/2021 .......... G06F 11/1448

* cited by examiner

*Primary Examiner* — Chae M Ko
(74) *Attorney, Agent, or Firm* — BainwoodHuang

(57) ABSTRACT

Technology is disclosed for recovering the consistency of a RAID (Redundant Array of Independent Disks) metadata database when data corruption is detected in the RAID metadata database. The RAID metadata database includes super sectors, stage sectors, and a data region. Valid data within the data region is a contiguous set of sectors extending from a head sector to a tail sector. In response to data corruption in one of the two super sectors, a set of pointers contained in the other super sector is used to identify the head sector and tail sector. In response to data corruption in both super sectors, the head sector and tail sector are located based on the contents of the sectors in the data region. Techniques are also disclosed for recovering consistency when the data corruption occurs in the stage sectors and/or data region.

19 Claims, 11 Drawing Sheets

RECOVERING CONSISTENCY OF A RAID (REDUNDANT ARRAY OF INDEPENDENT DISKS) METADATA DATABASE

TECHNICAL FIELD

The present disclosure relates generally to data storage systems that provide RAID (Redundant Array of Independent Disks) data protection, and more specifically to technology for recovering the consistency of a RAID metadata database when data corruption is detected in at least one part of the RAID metadata database.

BACKGROUND

Data storage systems are arrangements of hardware and software that include one or more storage processors coupled to non-volatile data storage drives, such as solid state drives and/or magnetic disk drives. Each storage processor may service host I/O requests received from physical and/or virtual host machines ("hosts"). The host I/O requests received by the storage processor may specify one or more storage objects (e.g. logical units ("LUNs"), and/or files, etc.) that are hosted by the storage system and identify user data that is written and/or read by the hosts. Each storage processor executes software that processes host I/O requests and performs various data processing tasks to organize and persistently store the user data in the non-volatile data storage drives of the data storage system.

Data storage systems use metadata when storing data into the non-volatile data storage drives of the data storage system, and such metadata may be stored in one or more databases. One such metadata database is a RAID metadata database that describes how mapped RAID data protection is applied by the data storage system when persistently storing user data and/or related metadata. The RAID metadata database is persistently stored in the non-volatile data storage drives of the data storage system, and loaded from the non-volatile data storage drives into the memory of the data storage system, e.g. at the time the data storage system boots up.

SUMMARY

In some data storage systems, RAID data protection may be used with regard to the RAID metadata database stored in non-volatile data storage, e.g. triple mirrored RAID-1. However, even where data protection is provided, there remain cases where data corruption may occur. For example, in a data storage system that protects the RAID metadata database using triple mirroring, data corruption could still occur within the RAID metadata database when two of the three drives on which the triple mirroring is based are rebuilding, and the third drive encounters a media error. In another example, data corruption could occur in the RAID metadata database as a result of a software bug that causes the wrong data to be written over the RAID metadata database. Data corruption in the RAID metadata database is a critical issue, since failure to recover the RAID metadata database may also result in other metadata being lost. In addition, data corruption in the RAID metadata database may cause the RAID functionality of the data storage system to become unavailable, and some data storage systems are not able to boot up in the case where data corruption is detected while loading the RAID metadata database.

To address the above described and other shortcomings of previous technologies, new technology is disclosed herein for recovering the consistency of a RAID metadata database when data corruption is detected within one or more parts of the RAID metadata database. In the disclosed technology, data corruption is detected in a RAID (Redundant Array of Independent Disks) metadata database that includes at least a data region and two super sectors. The super sectors include a primary super sector containing a first set of pointers indicating valid data within the data region, and a secondary super sector containing a second set of pointers also indicating valid data within the data region. In response to the data corruption being detected in one of the two super sectors, the disclosed technology uses the set of pointers contained in the other super sector to identify the portion of the data region that stores valid data.

In some embodiments, in response to data corruption being detected only in the secondary super sector, the disclosed technology uses the first set of pointers in the primary super sector to identify the portion of the data region that stores valid data.

In some embodiments, the portion of the data region that stores valid data is made up of a contiguous set of sectors within the data region extending from a head sector to a tail sector, and the first set of pointers in the primary super sector consists of or includes a logical block address of the head sector and a logical block address of the tail sector.

In some embodiments, in response to data corruption being detected only in the primary super sector, the disclosed technology uses the second set of pointers in the secondary super sector to identify the portion of the data region that stores valid data.

In some embodiments in which the portion of the data region that stores valid data is made up of a contiguous set of sectors within the data region extending from a head sector to a tail sector, the second set of pointers in the secondary super sector consists of or includes a logical block address of the head sector and a logical block address of the tail sector.

In some embodiments, the first set of pointers in the primary super sector consists of or includes a most recent set of pointers indicating a most recent set of valid data within the data region, and the second set of pointers in the secondary super sector consists of or includes a previous set of pointers indicating a previous set of valid data within the data region.

In some embodiments in which the portion of the data region storing valid data is made up of a contiguous set of sectors within the data region extending from a head sector to a tail sector, the disclosed technology operates in response to detecting data corruption in both super sectors by i) locating the head sector by searching the data region for a sector containing a magic number, and then identifying the sector containing the magic number as the head sector, and ii) locating the tail sector by traversing the sequential sectors of the data region located after the head sector until reaching a sector having a generation number smaller than a generation number contained in the head sector, and then identifying the sector containing the generation number smaller than the generation number contained in the head sector as the tail sector.

In some embodiments, in response to detecting data corruption in at least one sector in the portion of the data region that stores valid data, the disclosed technology may operate by i) loading, into memory, the sectors of valid data contained within the portion of the data region extending from the head sector to the tail sector; and ii) marking, in memory, each sector of the valid data in which data corruption was detected as invalid.

In some embodiments, the RAID metadata database further includes two stage sectors, including a primary stage sector containing data not yet stored in the portion of the data region that stores valid data and a secondary stage sector containing data previously stored in the portion of the data region that stores valid data. In such embodiments, in response to data corruption being detected in one of the two stage sectors, the disclosed technology loads data into memory only from the other stage sector.

Embodiments of the disclosed technology may provide significant advantages over previous technical solutions. For example, the disclosed technology enables a data storage system to handle data corruption in a RAID metadata database that may occur even where data protection is provided for the RAID metadata database. The disclosed technology enables recovery of RAID metadata database to a consistent state even when some portion of the RAID metadata database is lost, so that other metadata is not lost, so that the RAID functionality of the data storage system can become available, and so that the data storage system can complete the process of booting up.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
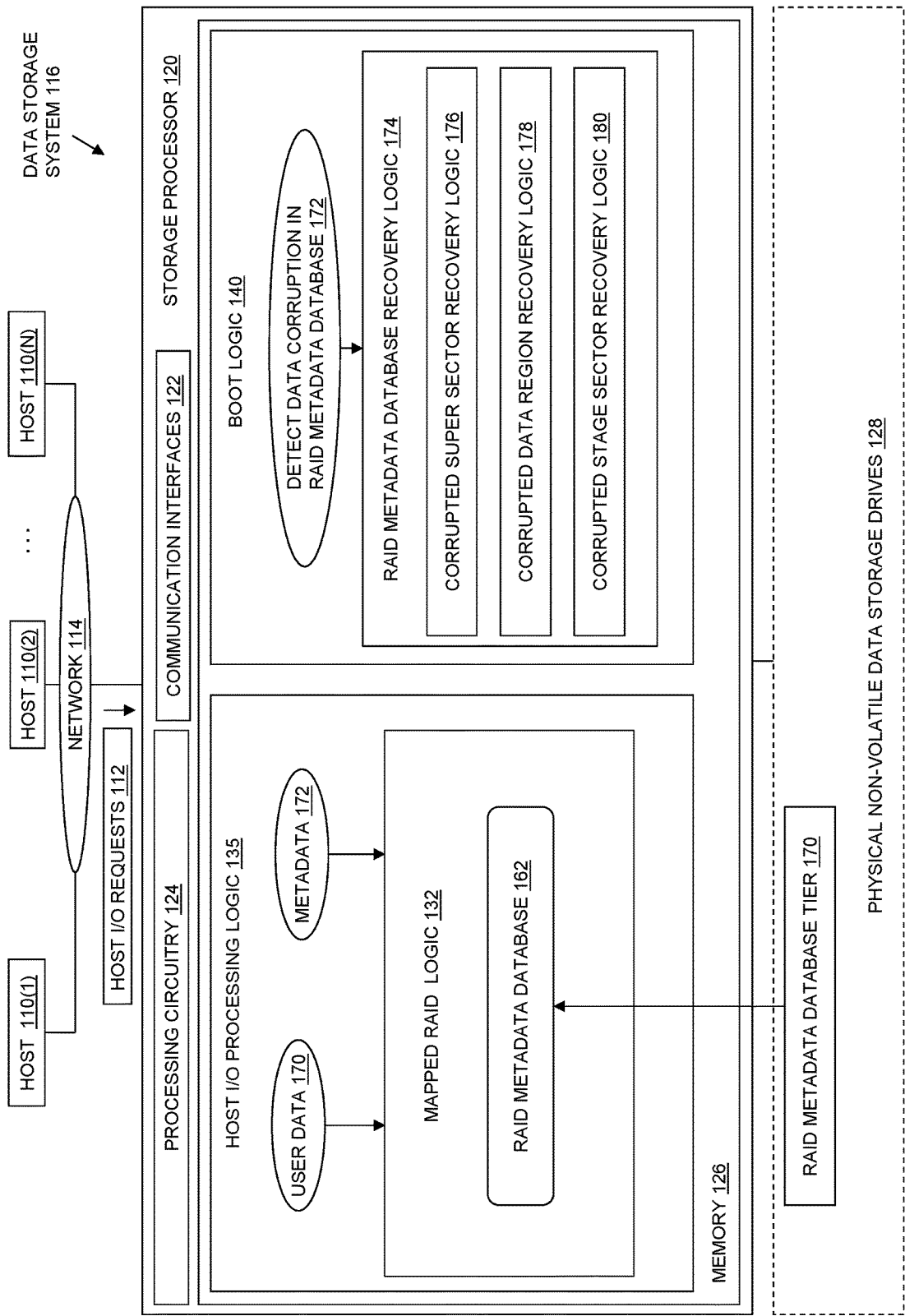
FIG. 1 is a block diagram showing an example of a data storage system in which the disclosed technology is embodied.

Embodiments of the invention will now be described with reference to the figures. The embodiments described herein are provided only as examples, in order to illustrate various features and principles of the disclosed technology, and the invention is broader than the specific embodiments described herein.

Embodiments of the disclosed technology provide improvements over previous technologies by recovering the consistency of a RAID metadata database in the face of data corruption detected within one or more parts of the RAID metadata database. The RAID (Redundant Array of Independent Disks) metadata database includes at least a data region and two super sectors. The super sectors include a primary super sector containing a first set of pointers indicating valid data within the data region, and a secondary super sector containing a second set of pointers indicating valid data within the data region. In response to data corruption detected in one of the two super sectors, the disclosed technology uses the set of pointers contained in the other super sector to identify a portion of the data region that stores valid data. In the case where data corruption is detected only in the secondary super sector, the first set of pointers in the primary super sector is used to identify the portion of the data region that stores valid data. In the case where data corruption is detected only in the primary super sector, the second set of pointers in the secondary super sector is used to identify the portion of the data region that stores valid data.

The portion of the data region that stores valid data is made up of a contiguous set of sectors within the data region, and extends from a head sector to a tail sector. The first set of pointers in the primary super sector includes a logical block address of the head sector and a logical block address of the tail sector, and the second set of pointers in the secondary super sector also includes a logical block address of the head sector and a logical block address of the tail sector. The first set of pointers in the primary super sector may consist of a most recent set of pointers (e.g. logical block addresses) indicating a most recent set of valid data within the data region, and the second set of pointers in the secondary super sector may consists of a previous set of pointers (e.g. logical block addresses) indicating a previous set of valid data within the data region.

In the case where data corruption is detected in both super sectors, the disclosed technology may operate to find the head and tail sectors within the data region by i) locating the head sector by searching the sectors in the data region for a sector containing a magic number, where the sector containing the magic number is the head sector, and ii) locating the tail sector by traversing the sectors of the data region located sequentially after the head sector until reaching a sector having a generation number smaller than a generation number contained in the head sector, where the traversed sector containing a generation number smaller than the generation number contained in the head sector may be identified as the tail sector.

In the case where data corruption is detected in at least one sector in the portion of the data region storing valid data in the data region, the disclosed technology i) loads, into memory from the non-volatile data storage, the sectors of valid data contained within the portion of the data region extending from the head sector to the tail sector; and ii) marks, in memory, each sector of the valid data in which data corruption was detected as invalid.

The RAID metadata database may further include two stage sectors, including a primary stage sector containing data not yet stored in the valid data of the data region and a secondary stage sector containing data previously stored in the valid data of the data region.

In response to data corruption being detected in one of the two stage sectors, the disclosed technology may load data from the non-volatile data storage into memory only from the other stage sector.

FIG. 1 is a block diagram showing an operational environment for the disclosed technology, including an example of a data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications may access data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110(1) and/or applications accessing data storage provided by Data Storage System 116 may execute within Data Storage System 116. Data Storage System 116 includes at least one Storage Processor 120 that is communicably coupled to both Network 114 and Physical Non-Volatile Data Storage Drives 128, e.g. at least in part though one or more Communication Interfaces 122. No particular hardware configuration is required, and Storage Processor 120 may be embodied as any specific type of device that is capable of processing host input/output (I/O) requests (e.g. I/O read and I/O write requests, etc.) and persistently storing user data.

The Physical Non-Volatile Data Storage Drives 128 may include physical data storage drives such as solid state drives, magnetic disk drives, hybrid drives, optical drives, and/or other specific types of drives.

A Memory 126 in Storage Processor 120 stores program code that is executable on Processing Circuitry 124, as well as data generated and/or processed by such program code. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry.

Processing Circuitry 124 and Memory 126 together form control circuitry that is configured and arranged to carry out various methods and functions described herein. The Memory 126 stores a variety of software components that may be provided in the form of executable program code. For example, Memory 126 may include software components such as Host I/O Processing Logic 135 and/or Boot Logic 140. When program code stored in Memory 126 is executed by Processing Circuitry 124, Processing Circuitry 124 is caused to carry out the operations of the software components. Although certain software components are shown in the Figures and described herein for purposes of illustration and explanation, those skilled in the art will recognize that Memory 126 may include various other types of software components, such as operating system components, various applications, hosts, other specific processes, etc.

During operation, Host I/O Processing Logic 135 persistently stores User Data 170 indicated by write I/O requests in Host I/O Requests 112 into the Physical Non-Volatile Data Storage Drives 128. RAID Logic 132 provides mapped RAID data protection for the User Data 170 indicated by write I/O requests in Host I/O Requests 112, and/or for related Metadata 172. In this regard, in order to provide mapped RAID data protection, RAID Logic 132 divides each of the non-volatile data storage drives in Physical Non-Volatile Data Storage Drives 128 into multiple, equal size drive extents. Each drive extent consists of physically contiguous non-volatile data storage located on a single data storage drive. For example, in some configurations, RAID Logic 132 may divide each one of the physical non-volatile data storage drives in Physical Non-Volatile Data Storage Drives 128 into the same fixed number of equal size drive extents of physically contiguous non-volatile storage. The size of the individual drive extents into which the physical non-volatile data storage drives in Physical Non-Volatile Data Storage Drives 128 are divided may, for example, be the same for every physical non-volatile data storage drive in Physical Non-Volatile Data Storage Drives 128. Various specific sizes of drive extents may be used in different embodiments. For example, in some embodiments, each drive extent may have a size of 10 gigabytes. Larger or smaller drive extent sizes may be used in the alternative for specific embodiments and/or configurations.

RAID Logic 132 organizes some or all of the drive extents in Physical Non-Volatile Data Storage Drives 128 into discrete sets of drive extents that are used to support corresponding RAID extents. Each set of drive extents is used to store data, e.g. User Data 170 or Metadata 172, that is written to a single corresponding logical RAID extent. For example, each set of drive extents is used to store data written to logical block addresses within a range of logical block addresses (LBAs) mapped to a corresponding logical RAID extent. Assignments and mappings of drive extents to their corresponding RAID extents are stored in RAID Metadata Database 162, e.g. in one or more RAID mapping tables. In this way RAID Metadata Database 162 describes how User Data 170 and/or Metadata 170 is stored by Data Storage System 116 in the Physical Non-Volatile Data Storage Drives 128 such that mapped RAID data protection is provided for User Data 170 and/or Metadata 172.

RAID Logic 132 stores data written to the range of logical block addresses mapped to a specific RAID extent using a level of RAID protection that is provided for that RAID extent. Parity based RAID protection or mirroring may be provided for individual RAID extents. For example, parity based RAID protection may use data striping ("striping") to distribute data written to the range of logical block addresses mapped to a given RAID extent together with corresponding parity information across the drive extents assigned and mapped to that RAID extent. For example, RAID Logic 132 may perform data striping by storing logically sequential blocks of data and associated parity information on different drive extents that are assigned and mapped to a RAID extent as according to the contents of the RAID Metadata Database 162. One or more parity blocks may be maintained in each stripe. For example, a parity block may be maintained for each stripe that is the result of performing a bitwise exclusive "OR" (XOR) operation across the logically sequential blocks of data contained in the stripe. When the data storage for a data block in the stripe fails, e.g. due to a failure of the drive containing the drive extent that stores the data block, the lost data block may be recovered by RAID Logic 132 performing an XOR operation across the remaining data blocks and a parity block stored within drive extents located on non-failing data storage drives. Various specific RAID levels having block level data striping with distributed parity may be provided by RAID Logic 132 for individual RAID extents. For example, RAID Logic 132 may provide block level striping with distributed parity error protection according to 4D+1P ("four data plus one parity") RAID-5 for one or more RAID extents, in which each stripe consists of 4 data blocks and a block of parity information. When 4D+1P RAID-5 is used for a RAID extent, at least five drive extents must be mapped to the RAID extent, so that each one of the four data blocks and the parity information for each stripe can be stored on a different drive extent, and therefore stored on a different storage drive. RAID Logic 132 may alternatively use 4D+2P RAID-6 parity based RAID protection to provide striping with double distributed parity information on a per-stripe basis.

The RAID Metadata Database 162 itself is persistently stored in RAID Metadata Database Tier 170, e.g. using three way mirroring data protection, e.g. three way mirrored RAID-1.

Boot Logic 140 operates to boot and initialize the Data Storage System 116, e.g. when the Data Storage System 116 powered up. During the process of booting and initializing Data Storage System 116, RAID Metadata Database 162 is loaded into Memory 126 from RAID Metadata Database Tier 170, so that RAID Logic 132 can subsequently access and use the contents of RAID Metadata Database 162 when providing RAID protection for User Data 170 and Metadata 172. At 172, data corruption may be detected in at least one part of the RAID Metadata Database 162 while loading the RAID Metadata Database 162 from RAID Metadata Database Tier 170 into Memory 126. For example, the data corruption may be detected as a media error of the like that occurs while RAID Metadata Database 162 is being loaded from RAID Metadata Database Tier 170, or through another type of data corruption detection technique.

In response to the detection of data corruption in RAID Metadata Database 162 while loading RAID Metadata Database 162 from RAID Metadata Database Tier 170 into Memory 126, Boot Logic 140 passes control to RAID Metadata Database Recovery Logic 174 so that RAID Metadata Database Recovery Logic 174 will recover RAID Metadata Database 162 to a consistent state that allows the boot process to continue. RAID Metadata Database Recovery Logic 174 includes logic for recovering RAID Metadata Database 162 in response to data corruption detected in different parts of RAID Metadata Database 162. Corrupted Super Sector Recovery Logic 176 recovers RAID Metadata Database 162 to a consistent state in response to detection of data corruption in one or more super sectors of RAID Metadata Database 162. Corrupted Data Region Recovery Logic 178 recovers RAID Metadata Database 162 to a consistent state in response to detection of data corruption in valid data stored in a data region of RAID Metadata Database 162. Corrupted Stage Sector Recovery Logic 180 recovers RAID Metadata Database 162 to a consistent in response to detection of data corruption in one or more stage sectors in RAID Metadata Database 162. After recovery of RAID Metadata Database 162 to a consistent state by RAID Metadata Database Recovery Logic 174, Boot Logic 140 continues with booting and initializing Data Storage System 116, and Mapped RAID Logic 132 uses the recovered RAID Metadata Database 162 to complete booting and initializing Data Storage System 116, and/or to provide RAID protection for User Data 170 and Metadata 172.

For example, as further described herein, RAID Metadata Database 162 may include at least a data region and two super sectors. The super sectors include a primary super sector containing a first set of pointers indicating valid data within the data region, and a secondary super sector containing a second set of pointers indicating valid data within the data region.

In response to data corruption being detected in only one of the two super sectors, Corrupted Super Sector Recovery Logic 176 uses the set of pointers contained in the other super sector to identify a portion of the data region that stores valid data. For example, in response to data corruption being detected only in the secondary super sector, Corrupted Super Sector Recovery Logic 176 uses the set of pointers in the primary super sector to identify the portion of the data region that stores valid data. In response to data corruption being detected only in the primary super sector, Corrupted Super Sector Recovery Logic 176 uses the set of pointers in the secondary super sector to identify the portion of the data region that stores valid data.

As further described herein, the portion of the data region in RAID Metadata Database 162 that stores valid data may consist of a contiguous set of sectors within the data region of RAID Metadata Database 162, and extend from a head sector to a tail sector. The first set of pointers in the primary super sector may consist of or include a logical block address of the head sector and a logical block address of the tail sector. Using the pointers in the primary super sector to identify the portion of the data region that stores valid data may consist of or include using the logical block address of the head sector and the logical block address of the tail sector in the set of pointers in the primary super sector to locate the head sector and the tail sector. Similarly, the second set of pointers in the secondary super sector may consist of or include a logical block address of the head sector and a logical block address of the tail sector. Using the pointers in the secondary super sector to identify the portion of the data region that stores valid data may consist of or include using the logical block address of the head sector and the logical block address of the tail sector in the set of pointers in the secondary super sector to locate the head sector and the tail sector of the portion of the data region that contains valid data.

In some embodiments, the first set of pointers in the primary super sector may consist of or include a most recent set of pointers indicating a portion of the data region in RAID Metadata Database 162 that stores a most recent set of valid data. The second set of pointers in the secondary super sector may consist of or include a previous set of pointers indicating a previous set of valid data, such as a previous set of valid data consisting of the valid data that was present within the data region prior to completion of a most recent transaction or operation that modified the valid data (e.g. by adding a sector of data to the valid data at the tail, or by reducing the total number of sectors used to store valid data by removing a sector at the head, etc.).

Corrupted Super Sector Recovery Logic 176 operates in response to the detection of data corruption in both super sectors of RAID Metadata Database 162 by i) locating the head sector by searching the data region for a sector containing a magic number, and identifying the sector containing the magic number as the head sector, and ii) locating the tail sector by sequentially traversing the contiguous sectors of the data region located after the head sector until reaching a sector having a generation number that is smaller than the generation number contained in the head sector, and identifying the sector containing the generation number smaller than the generation number contained in the head sector as the tail sector. The magic number contained in the head sector may be a predetermined unique value that may be stored in the head sector to identify the head sector within the sectors of the data region of RAID Metadata Database 162.

Corrupted Data Region Recovery Logic 178 operates in response to the detection of data corruption in at least one sector in the portion of the data region in RAID Metadata Database 162 that stores valid data by i) loading, into Memory 126 from RAID Metadata Database Tier 170, the sectors of valid data contained within the portion of the data region extending from the head sector to the tail sector; and ii) marking, in Memory 126, each sector of the valid data in which data corruption was detected as invalid data.

As further described herein, the RAID Metadata Database 162 may include two stage sectors, including a primary stage sector containing data not yet stored in the portion of the data region that stores valid data, and a secondary stage sector containing data previously stored in the portion of the data region that stores valid data. In response to the detection of data corruption in one of the two stage sectors, Corrupted Stage Sector Recovery Logic 180 loads data into memory only from the other stage sector.

Figure 2:
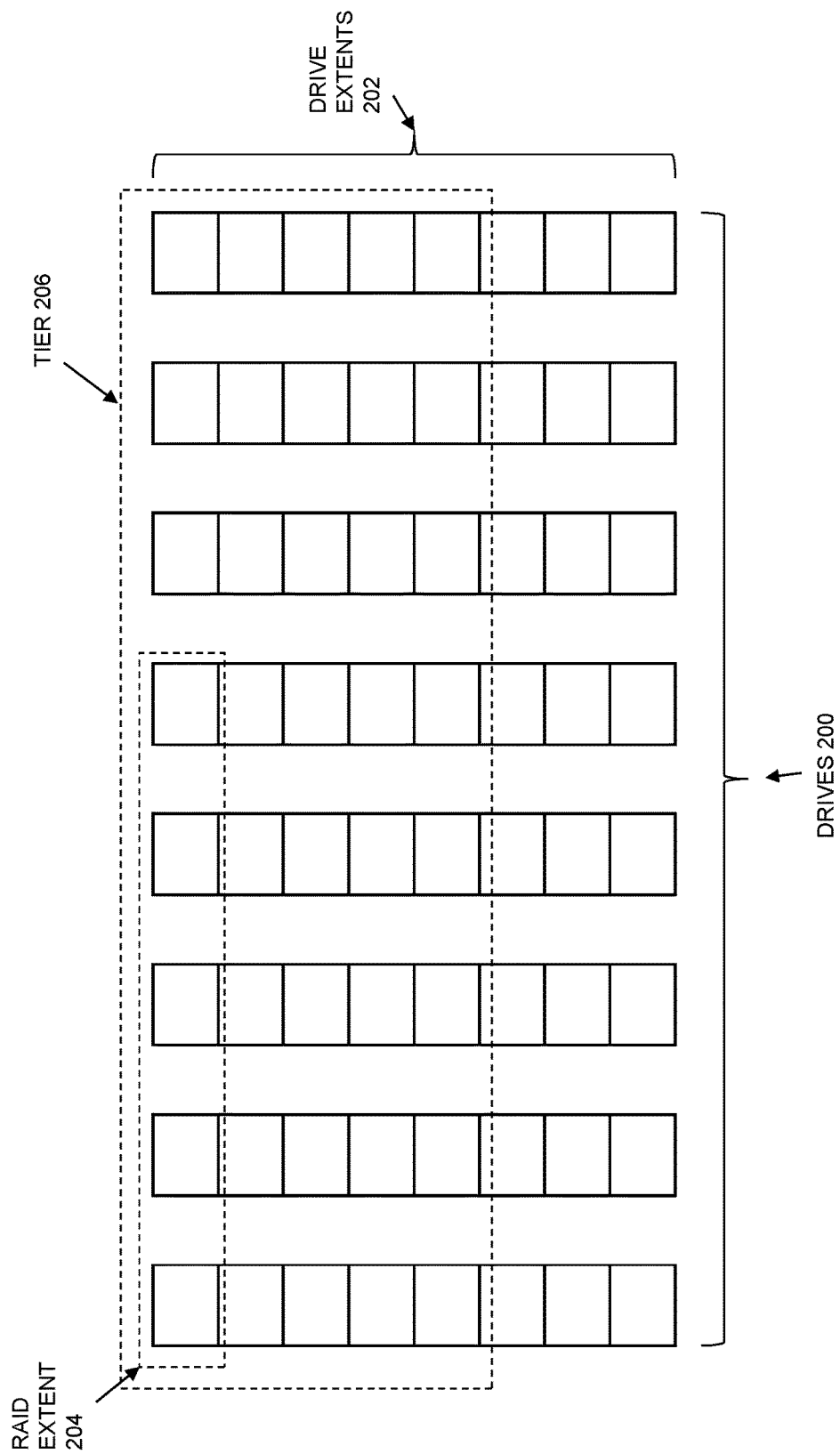
FIG. 2 is a block diagram showing an example of drive extents, a RAID extent, and a data storage tier, and illustrating mapped RAID technology in some embodiments.

FIG. 2 is a block diagram showing an example of non-volatile data storage drives, i.e. Drives 200, that are divided into Drive Extents 202. Drives 200 are an example of Physical Non-Volatile Data Storage Drives 128. FIG. 2 shows an example of a RAID Extent 204, and shows a set of five drive extents within RAID Extent 204 that are assigned and mapped to RAID Extent 204, e.g. by indications of such assignments and mappings stored within RAID Metadata Database 162. The five drive extents within RAID Extent 204 are used (e.g. by Mapped RAID Logic 132) to store data that is written to RAID Extent 204. In the example of FIG. 2, the five drive extents assigned and mapped to RAID Extent 204 may be used to provide 4D+1P ("four data plus one parity") RAID-5 for data written to RAID Extent 204. As also shown in the example of FIG. 2, a single storage Tier 206 may extend across a relatively larger set of drive extents in Drive Extents 202 than are used to support a single RAID extent, and may contain multiple RAID extents.

Figure 3:
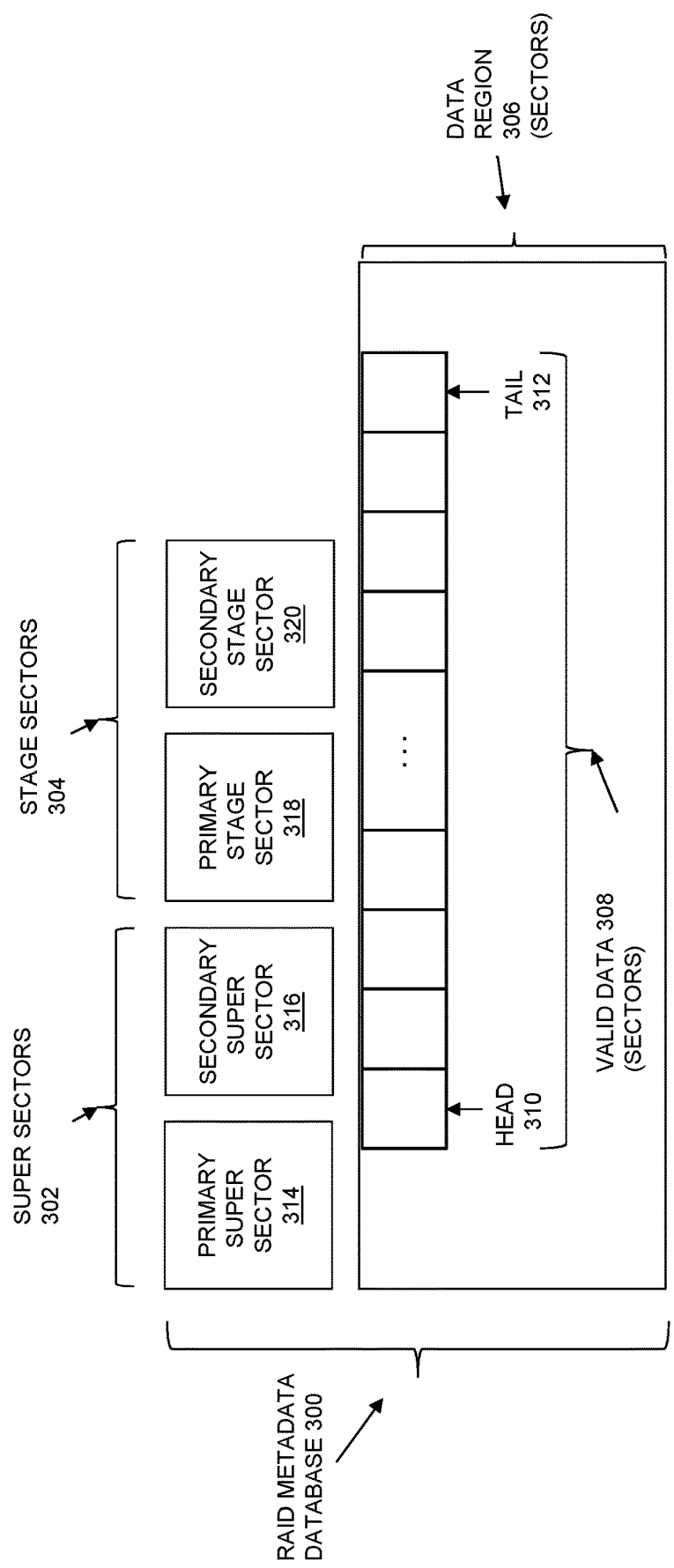
FIG. 3 is a block diagram showing an example structure of a RAID metadata database in some embodiments.

FIG. 3 is a block diagram that shows an example of the structure of the disclosed RAID metadata database. The structure of RAID Metadata Database 300 is an example of how RAID Metadata Database 162 may be structured in non-volatile data storage, e.g. within a tier of non-volatile data storage such as RAID Metadata Database Tier 170 shown in FIG. 1. In the example of FIG. 3, RAID Metadata Database 300 consists of two Super Sectors 302 (e.g. Primary Super Sector 314 and Secondary Super Sector 316), two Stage Sectors 304 (Primary Stage Sector 318 and Secondary Stage Sector 320), and a Data Region 306 made up of contiguous sectors that may store valid data. Each sector in Super Sectors 302, Stage Sectors 304, and Data Region 306 is a block of contiguous non-volatile data storage of a predetermined size, e.g. a four kilobyte block.

The Super Sectors 302 are sectors that contain information describing the structure and/or current state of the Valid Data 308 within Data Region 306. Primary Super Sector 314 contains a first set of pointers indicating Valid Data 308 within Data Region 306. The pointers in Primary Super Sector 314 are a most recent set of pointers to valid data in Data Region 306, and indicate the most recent set of valid data in Data Region 306, e.g. Valid Data 308. Valid Data 308 is a contiguous set of sectors within Data Region 306 that currently contain valid data, and that extend sequentially from a head sector (e.g. Head 310) to a tail sector (e.g. Tail 312). Data may be added to Valid Data 308 by adding new sectors of data at Tail 312, and the total size of Valid Data 308 may be reduced by removing sectors at Head 310. The pointers in Primary Super Sector 314 may include a logical block address of Head 310 of Valid Data 308, and a logical block address of Tail 312 of Valid Data 308.

Secondary Super Sector 316 contains a second set of pointers. The pointers in Secondary Super Sector 316 are a previous set of pointers to a previous set of valid data in Data Region 306. The pointers in Secondary Super Sector 316 point to the valid data in Data Region 306 as it existed prior to completion of a most recent transaction or operation that modified the valid data, e.g. by i) adding new sector of data to the valid data, or ii) reducing the total number of sectors used to store valid data, etc.

When Valid Data 308 is subsequently modified (e.g. when one or more sectors are added to or removed from Valid Data 308), i) the current primary super sector (e.g. Primary Super Sector 314) becomes the new secondary super sector, and ii) the current secondary super sector (e.g. Secondary Super Sector 316) becomes the new primary super sector, and is modified to store pointers indicating the head and tail of the modified set of valid data (the new current set of valid data).

Stage Sectors 304 are used to store data prior to the data being added to Valid Data 308. Primary Stage Sector 318 stores data that has not yet been added to Valid Data 308, while Secondary Stage Sector 320 stores the data that was last added to Valid Data 308.

RAID Metadata Database 300 may be structured as a transaction log, and the data stored in Valid Data 308 may be organized into log structures, each of which represents a corresponding transaction that modifies RAID Metadata Database 300. Stage Sectors 304 may be used to accumulate log structures corresponding to smaller transactions, which are eventually added to Valid Data 308 from the primary stage sector. For example, Primary Stage Sector 318 may accumulate log structures for relatively small database transactions until it reaches a threshold degree of fullness, and then add the log structures accumulated in Primary Stage Sector 318 to Valid Data 308 (e.g. within a sector of Data Region 306 that is added to Valid Data 308 at Tail 312). At that point, Secondary Stage Sector 320 then becomes the new primary stage sector, and begins to accumulate log structures for subsequently received transactions that modify RAID Metadata Database 300, which will eventually be moved to the valid data in Data Region 306.

Figure 4:
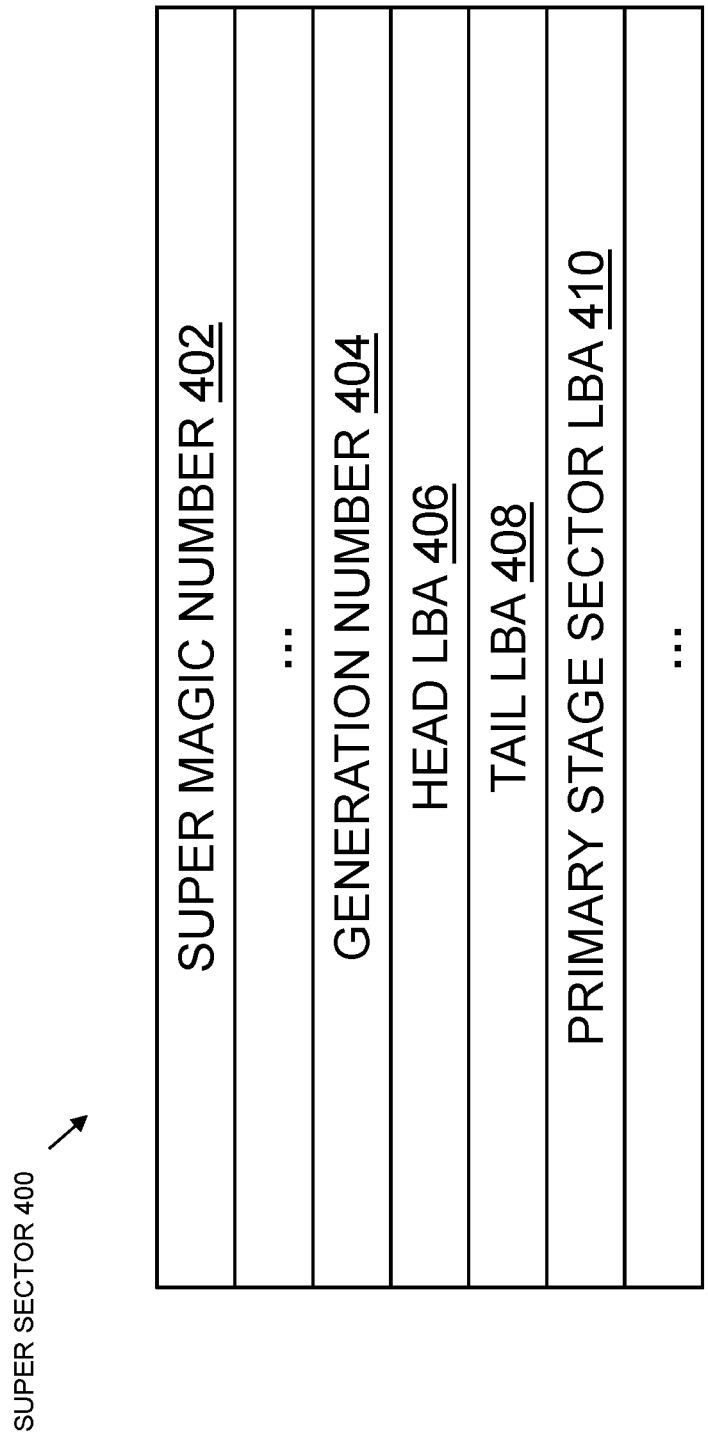
FIG. 4 is a block diagram showing an example format of a super sector in the RAID metadata database in some embodiments.

FIG. 4 is a block diagram showing an example format of the super sectors in the RAID metadata database in some embodiments. Super Sector 400 is the format for both the primary super sector and the secondary super sector. Super Magic Number 402 may be a unique predetermined value that is used to locate the super sectors and/or distinguish the primary super sector from the secondary super sector. Generation Number 404 is a value of a monotonically increasing generation number that is incremented for each transaction that is performed on the RAID metadata database. In the primary super sector, the Head LBA 406 and Tail LBA 408 are logical block addresses of the head and tail sectors of the most recent set of valid data within the data region. In the secondary super sector, the Head LBA 406 and Tail LBA 408 are logical block addresses of the head and tail sectors of the previous set of valid data within the data region. In some embodiments, Primary Stage Sector LBA 410 may also store a logical block address identifying the primary stage sector.

Figure 5:
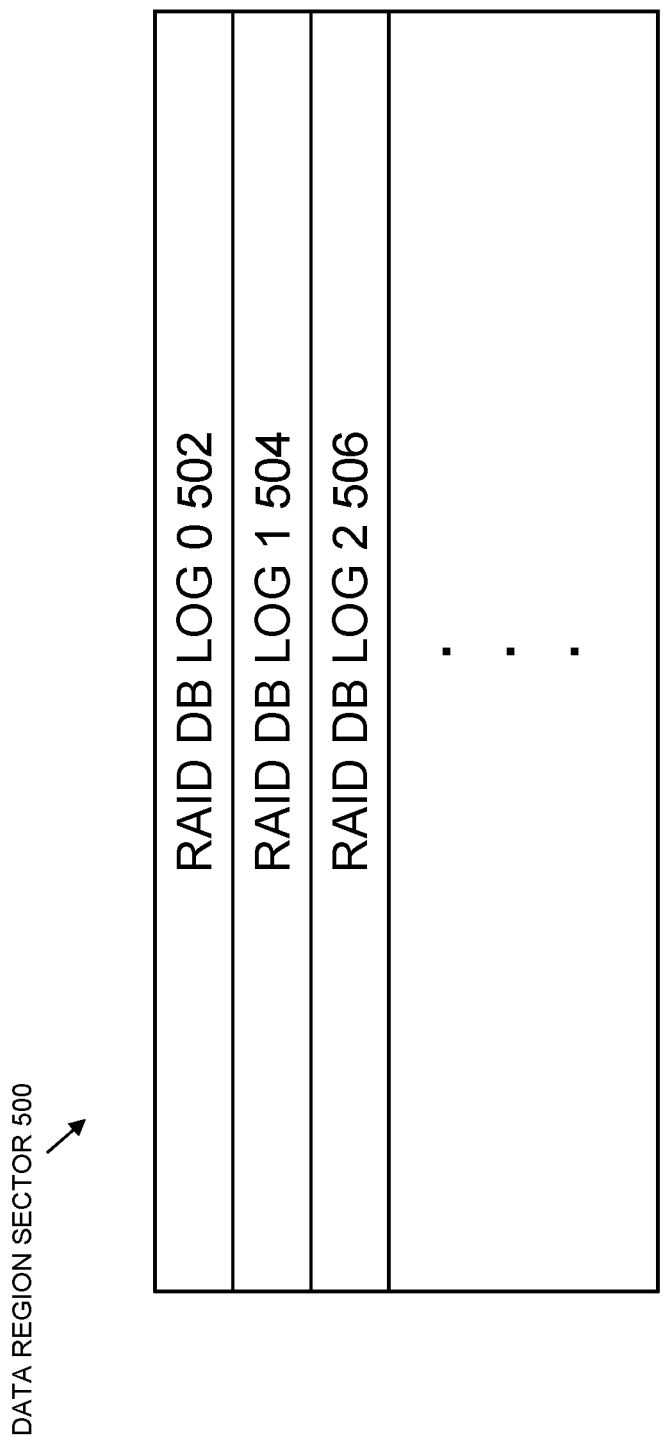
FIG. 5 is a block diagram showing an example format of a data region sector of the RAID metadata database in some embodiments.

FIG. 5 is a block diagram showing an example format for the sectors located within the data region of the RAID metadata database in some embodiments. The sectors of the data region (e.g. the sectors of the data region storing valid data) may each contain one or more RAID metadata database log structures that each store a corresponding transaction that has been performed on the RAID metadata database, e.g. the data added to the RAID metadata database by a completed write transaction. In FIG. 5, RAID metadata database log structures are shown for purposes of illustration by RAID DB Log 0 502, RAID DB Log 1 504, RAID DB Log 2 506, and so on. The size of each individual RAID metadata database log structure depends on the size of the corresponding transaction (e.g. on the amount of data written to the RAID metadata database by the corresponding transaction), and the number of RAID metadata database log structures stored in a single sector accordingly depends on the sizes of the corresponding transactions. For example, the size of a single RAID metadata database log structure will not exceed the sector size, e.g. four kilobytes. In the case where the changes made by a single transaction are relatively small, the transaction may be represented by a single corresponding RAID metadata database log structure stored in a single sector. However, in the case where the size of the changes made by a transaction are large (e.g. sixteen kilobytes), multiple RAID metadata database log structures may be stored in multiple sectors in order to persist the transaction within the data region of the RAID metadata database.

The structure of each one of the stage sectors of the RAID metadata database may be the same as the format for the data region sectors shown in FIG. 5.

Figure 6:
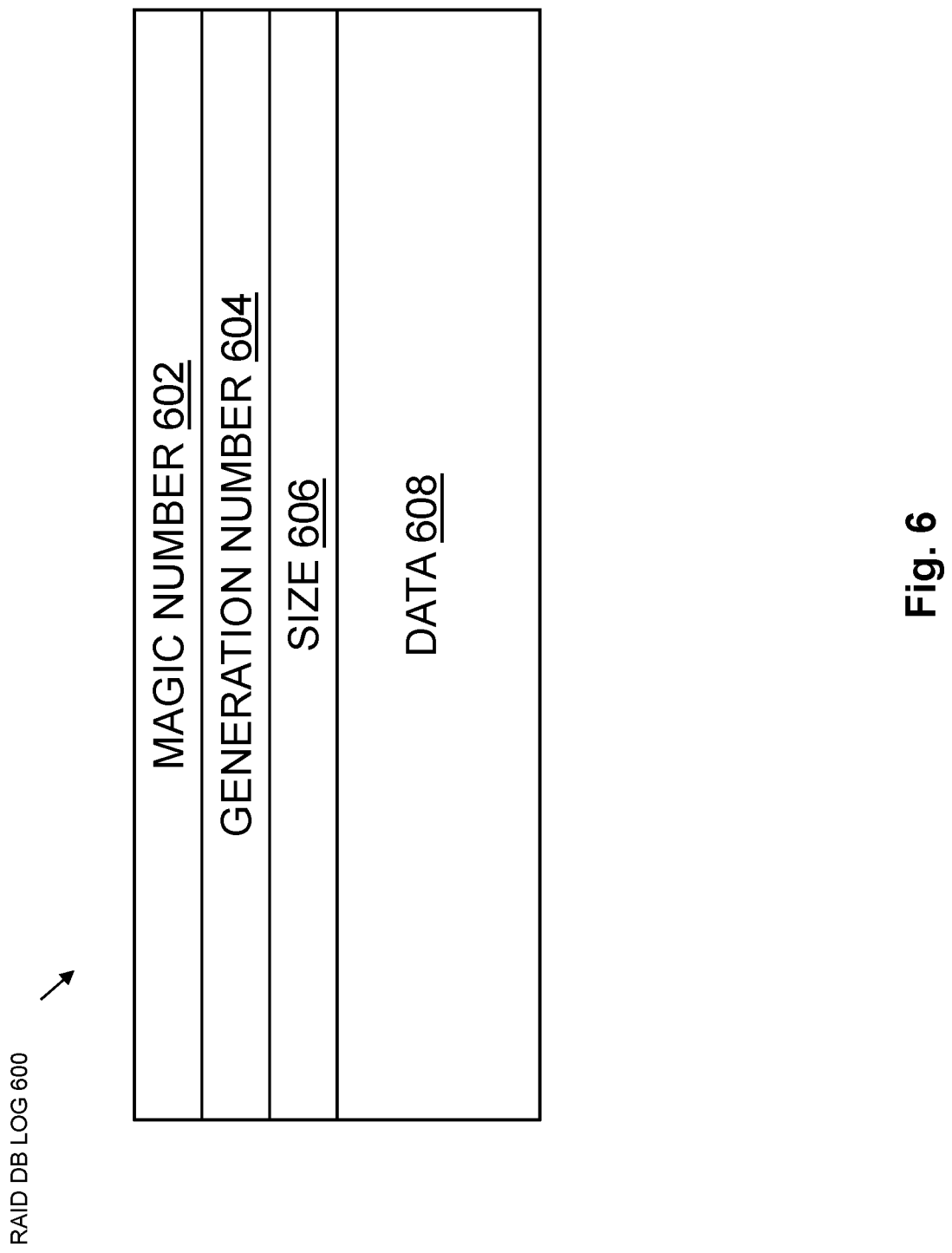
FIG. 6 is a block diagram showing an example format of the RAID database log data structure in some embodiments.

FIG. 6 is a block diagram showing an example format of a RAID metadata database log structure in some embodiments, e.g. RAID DB Log 600. In the example of FIG. 6, RAID DB Log 600 includes a Magic Number 602. There are two different magic numbers that may be stored in Magic Number 602, e.g. MAGIC_NUMBER_DATA_READ and MAGIC_NUMBER_DATA. If a RAID metadata database log structure contains MAGIC_NUMBER_DATA_READ in Magic Number 602, then that RAID metadata database log structure is contained in a sector within the data region of the RAID metadata database that is the head sector of the valid data within the data region of the RAID metadata database. Otherwise, if a RAID metadata database log structure contains MAGIC_NUMBER_DATA in Magic Number 602, then that RAID metadata database log structure is contained in a sector within the data region of the RAID metadata database log structure that is not the head sector of the valid data within the data region of the RAID metadata database. Generation Number 604 stores a current value of the monotonically increasing generation number that is incremented for each transaction, the value of the generation number at the time the RAID metadata database log structure is stored into the valid data of the data region of the RAID metadata database. For example, when processing a single transaction, the disclosed technology may use the same value of the generation number to write the generation numbers in the RAID metadata database log structures added to the valid data in the data region, the new primary super sector, and the new primary stage sector. Size 606 stores the size of the RAID metadata database log structure, and Data 608 stores the modifications to the RAID metadata database made by the corresponding transaction.

Figure 7:
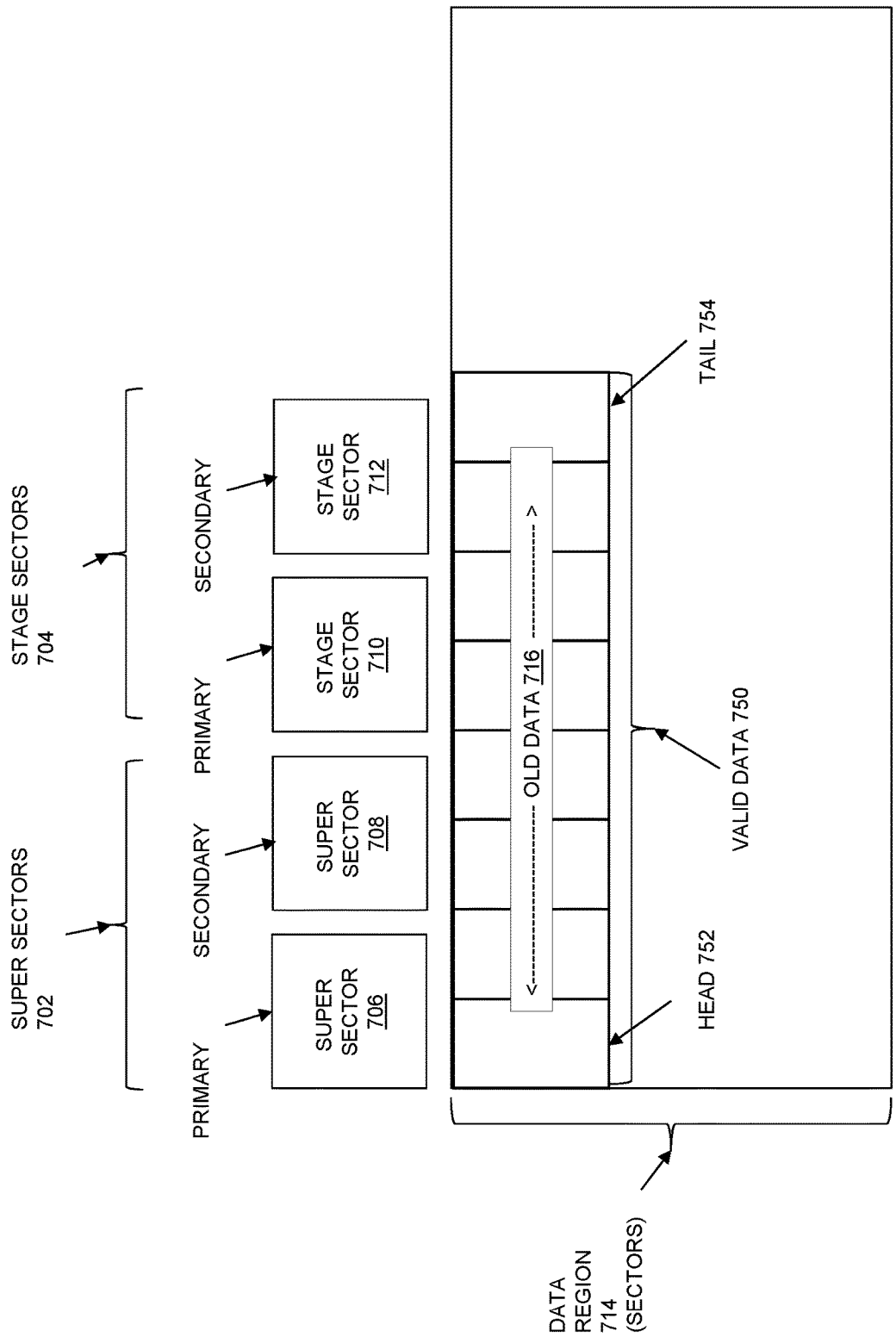
FIG. 7 is a block diagram showing an example of the RAID metadata database.

FIG. 7 is a block diagram showing the RAID metadata database before new data is added to the valid data in the data region. In the example of FIG. 7, Super Sectors 702 include Super Sector 706 and Super Sector 708, and Super Sector 706 is the primary super sector. Stage Sectors 704 include Stage Sector 710 and Stage Sector 712, and Stage Sector 710 is the primary stage sector. Data Region 714 includes a portion of valid data shown by Valid Data 750. The head sector of Valid Data 750 is Head 752, and the tail sector of Valid Data 750 is Tail 754. Valid Data 750 is made up of Old Data 716. Over time, RAID metadata database log structures representing modifications to the RAID metadata database are accumulated in the primary stage sector, e.g. Stage Sector 710. At some point the contents of the primary stage sector are added to Valid Data 750 at Tail 754, e.g. when the primary sector reaches a threshold level of fullness.

Figure 8:
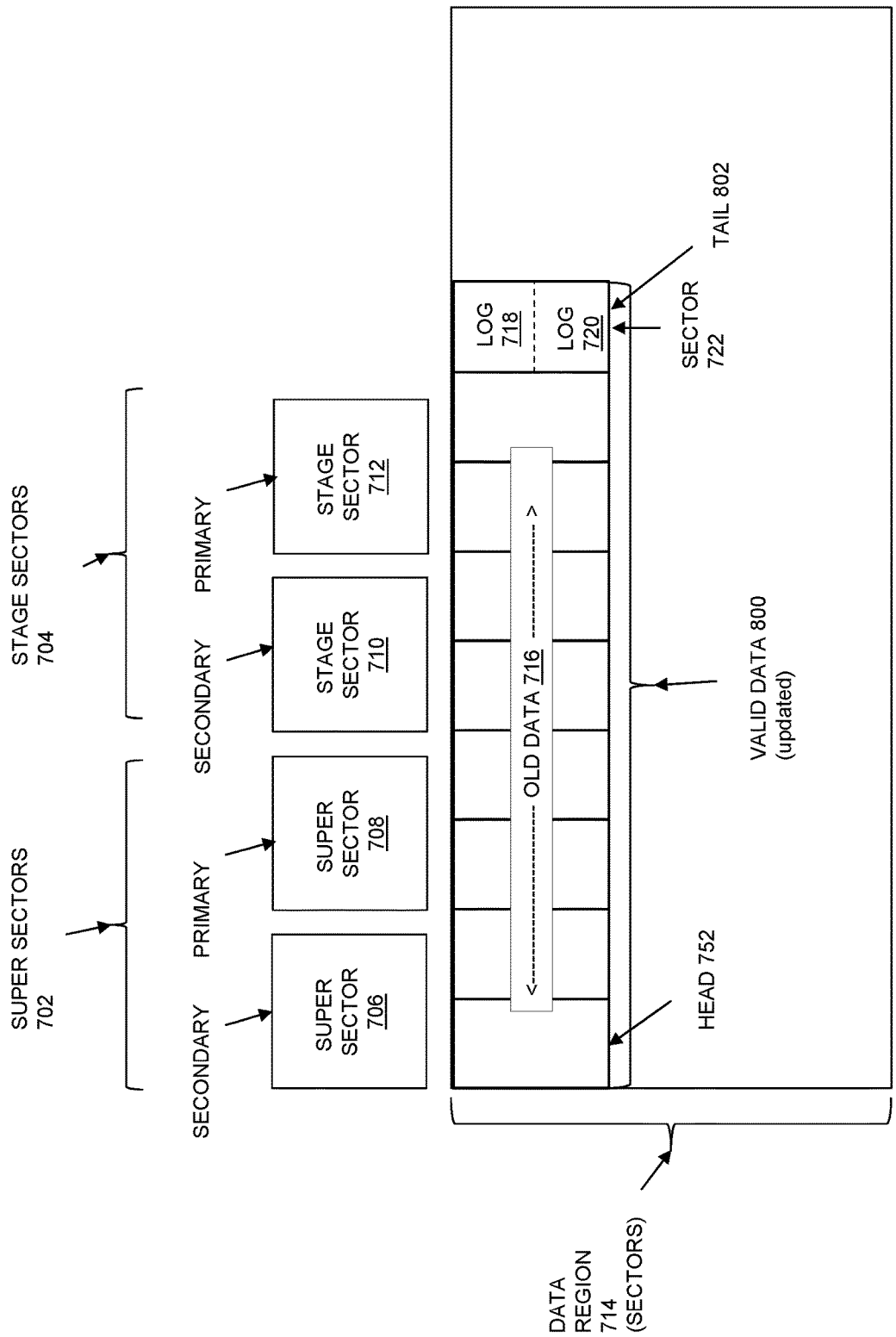
FIG. 8 is a block diagram showing the RAID metadata database of FIG. 7 after moving data from a stage sector to the valid data within the data region.

FIG. 8 shows the RAID metadata data base shown in FIG. 7 after the contents of the primary stage sector has been added to the valid portion of the data region. As shown in FIG. 8, the updated Valid Data 800 has been updated to include another sector of valid data that stores the data added to the valid data from Stage Sector 710, e.g. Sector 722 storing two RAID metadata database log structures, e.g. Log 718 and Log 720. The tail of Valid Data 800 is updated to Sector 722, as shown by Tail 802. Stage Sector 710 becomes the new secondary stage sector, and Stage Sector 712 is the new primary stage sector for accumulating modifications to the RAID metadata database. Super Sector 706 becomes the new secondary super sector, storing logical block addresses of the head and tail sectors of the valid data prior to the addition of Sector 722 to the valid data (e.g. logical block addresses of Head 752 and Tail 754). Super Sector 708 becomes the new primary super sector, and the logical block addresses of the head and tail sectors for the updated valid data are stored in Super Sector 708 (e.g. logical block address of Head 752 and Tail 802).

Figure 9:
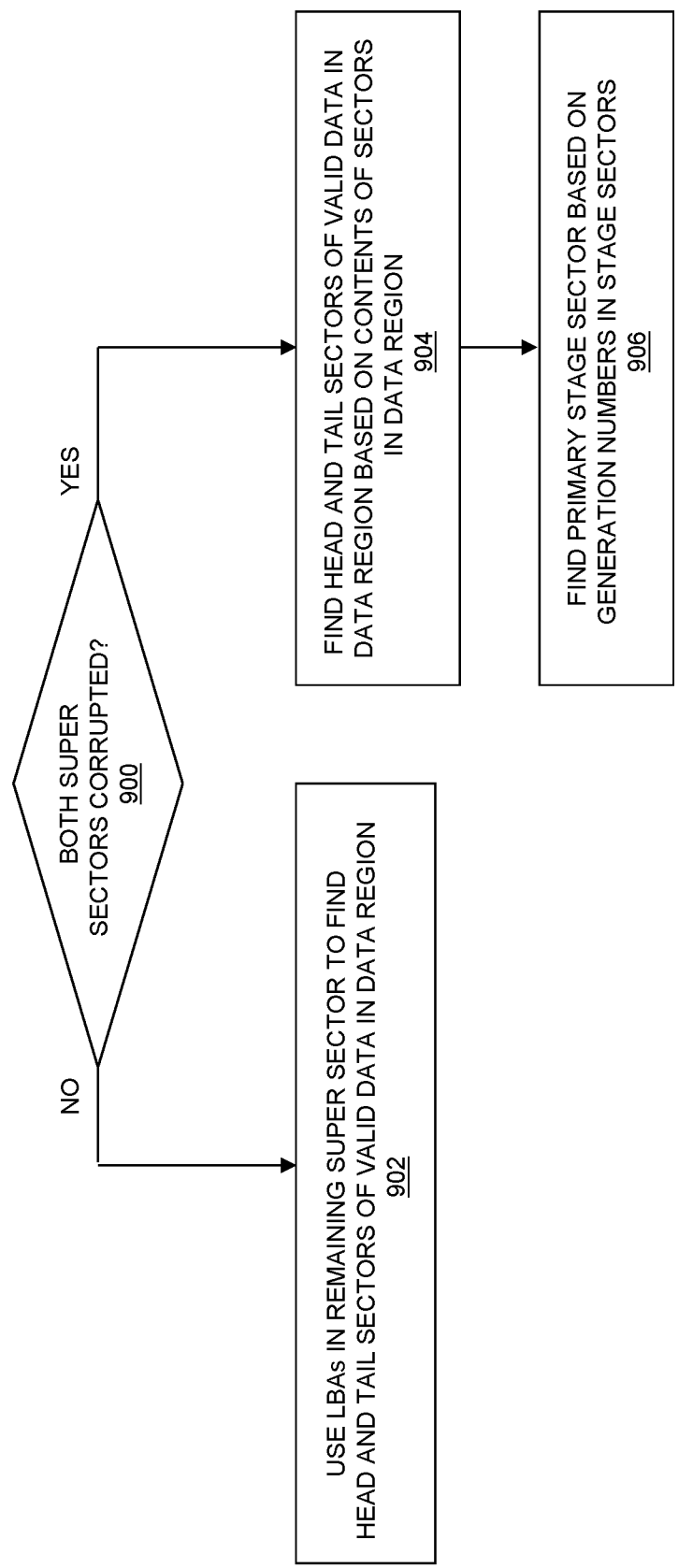
FIG. 9 is a flow chart showing steps performed in response to data corruption within one or more super sectors of the RAID metadata database in some embodiments.

FIG. 9 is a flow chart showing steps performed in response to data corruption within one or more super sectors of the RAID metadata database in some embodiments. The steps of FIG. 9 may be performed by Corrupted Super Sector Recovery Logic 176 shown in FIG. 1.

At 900, a determination is made as to whether data corruption has been detected in both the primary and secondary super sector. If data corruption has been detected in both super sectors, step 900 is followed by step 904. Otherwise, step 900 is followed by step 902, in which the logical block addresses stored in the primary super sector are used to locate the head and tail sectors of the valid data in the data region of the RAID metadata database.

At 904, the head and tail sectors of the valid data are identified based on the contents of the sectors in the data region. For example, at step 904, the disclosed technology may identify the head sector by searching the data region for a sector containing a magic number uniquely identifying the head sector. In the case where the data region has more than one sector containing the magic number uniquely identifying the head sector, the sector containing the magic number uniquely identifying the head sector having the highest generation number is selected as the head sector. Further at step 904, the disclosed technology may identify the tail sector by sequentially traversing the contiguous sectors of the data region following the head sector until a sector is reached having a generation number that is smaller than the generation number contained in the head sector. At that point, the sector containing the generation number smaller than the generation number contained in the head sector may be identified as the tail sector.

At 906, the primary stage sector may be identified based on the values of the generation numbers stored in the stage sectors. For example, the primary stage sector may be identified as the one of the stage sectors storing a generation number that matches a generation number stored in the sector most recently added to the valid data (e.g. the tail sector of the valid data).

Figure 10:
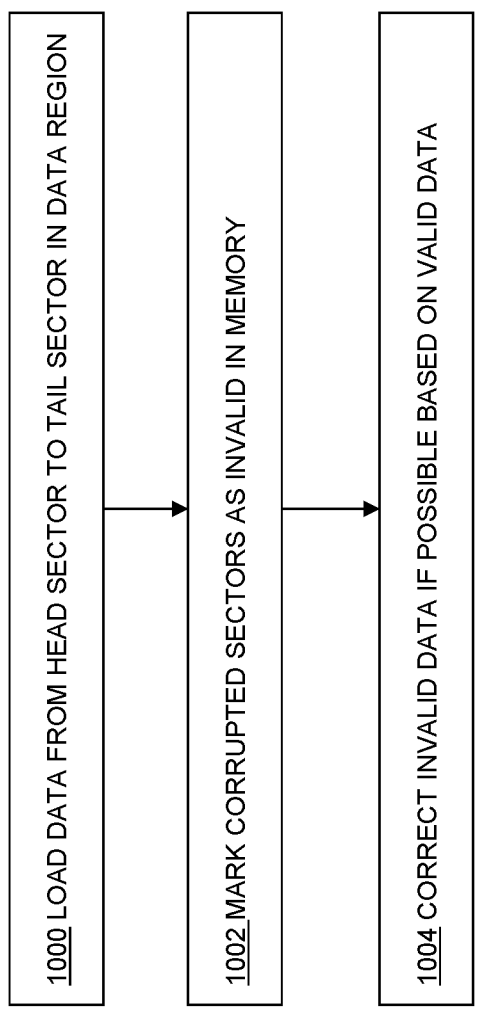
FIG. 10 is a flow chart showing steps performed in response to data corruption within a portion of valid data within the data region of the RAID metadata database in some embodiments.

FIG. 10 is a flow chart showing steps performed in response to data corruption within a portion of valid data within the valid data in the data region of the RAID metadata database. The steps of FIG. 10 may be performed by Corrupted Data Region Recovery Logic 178 shown in FIG. 1.

At 1000, data is loaded from non-volatile data storage to memory of the data storage system from the sectors of the data region extending from the head sector to the tail sector of the valid data in the data region.

At 1002, each sector of the valid data that contains corrupted data is marked as invalid in the memory of the data storage system.

At 1004, the disclosed technology may attempt to correct the data that was marked as invalid at step 1002, e.g. based on related information within the RAID metadata database.

While some data is lost due to the corruption of the data in the valid data of the data region, the RAID metadata database is brought to a consistent state, allowing it to be used to continue the boot and initialization process.

Figure 11:
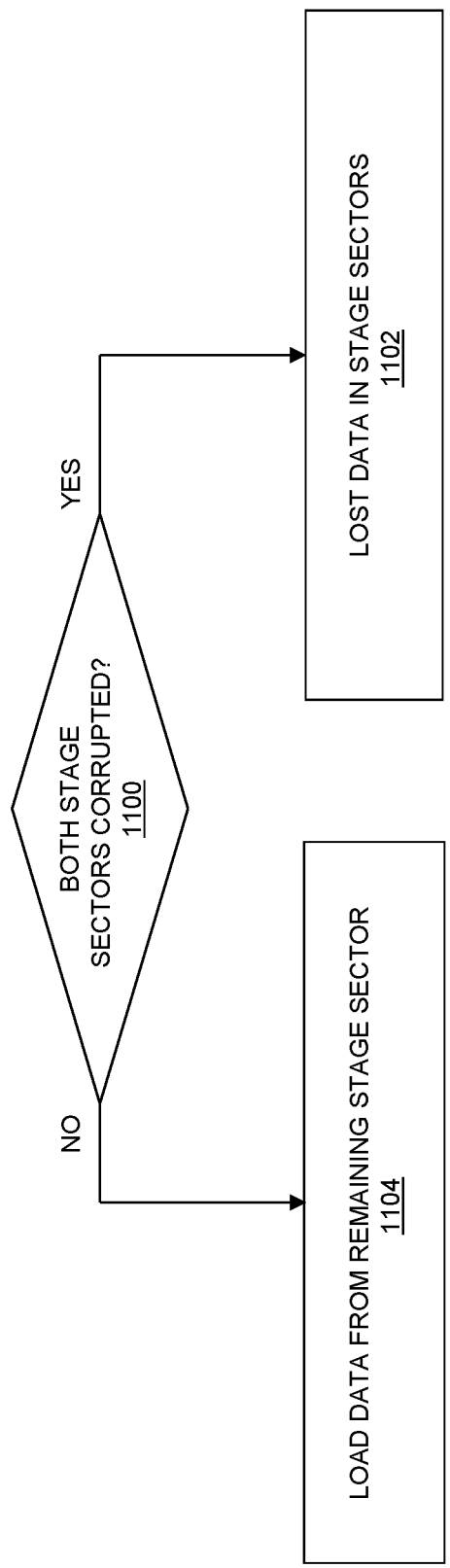
FIG. 11 is a flow chart showing steps performed in response to data corruption within one or more stage sectors of the RAID metadata database in some embodiments.

FIG. 11 is a flow chart showing steps performed in response to data corruption within one or more stage sectors of the RAID metadata database. The steps of FIG. 11 may be performed by the Corrupted Stage Sector Recovery Logic 180 shown in FIG. 1.

At 1100, a determination is made as to whether data corruption has been detected in both stage sectors. If so, step 1100 is followed by step 1102. Otherwise, step 1100 is followed by step 1104.

At 1102, the RAID metadata database is loaded into memory without the data stored in either stage sector. As a result, data stored in the stage sectors for one or more transactions is lost.

At 1104, in the case where only the data in the secondary stage sector is corrupted, the RAID metadata database is loaded including the data stored in the primary stage sector. No data is lost. In the case where only the data in the primary stage sector is corrupted, the RAID metadata database is loaded including the data in the secondary stage sector, but the data in the primary stage sector (representing the newest transaction data) is lost.

While some data may be lost due to the corruption of the data in one or more of the stage sectors, the RAID metadata database is brought to a consistent state, allowing it to be used to continue the boot and initialization process.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
    detecting data corruption in a RAID (Redundant Array of Independent Disks) metadata database, wherein the RAID metadata database includes a data region and two super sectors, wherein the super sectors include a primary super sector containing a first set of pointers indicating valid data within the data region and a secondary super sector containing a second set of pointers indicating valid data within the data region; and
    in response to the data corruption being in one of the two super sectors, using the set of pointers contained in the other super sector to identify a portion of the data region that stores valid data.

2. The method of claim 1, further comprising:
    in response to the data corruption being detected only in the secondary super sector, using the first set of pointers in the primary super sector to identify the portion of the data region that stores valid data.

3. The method of claim 2, wherein the portion of the data region that stores valid data comprises a contiguous set of sectors within the data region extending from a head sector to a tail sector, and wherein the first set of pointers in the primary super sector comprises a logical block address of the head sector and a logical block address of the tail sector.

4. The method of claim 1, further comprising:
    in response to the data corruption being detected only in the primary super sector, using the second set of pointers in the secondary super sector to identify the portion of the data region that stores valid data.

5. The method of claim 4, wherein the portion of the data region that stores valid data comprises a contiguous set of sectors within the data region extending from a head sector to a tail sector, and wherein the second set of pointers in the secondary super sector comprises a logical block address of the head sector and a logical block address of the tail sector.

6. The method of claim 1, wherein the first set of pointers in the primary super sector comprises a most recent set of pointers indicating a most recent set of valid data within the data region; and
wherein the second set of pointers in the secondary super sector comprises a previous set of pointers indicating a previous set of valid data within the data region.

7. The method of claim 1, wherein the portion of the data region storing valid data comprises a contiguous set of sectors within the data region extending from a head sector to a tail sector;
further comprising, in response to detecting data corruption in both super sectors:
locating the head sector by searching the data region for a sector containing a magic number, wherein the sector containing the magic number is the head sector, and
locating the tail sector by traversing sectors of the data region located after the head sector until reaching a sector having a generation number smaller than a generation number contained in the head sector, wherein the sector containing the generation number smaller than the generation number contained in the head sector is the tail sector.

8. The method of claim 7, further comprising, in response to detecting data corruption in at least one sector within the portion of the data region storing valid data:
loading, into memory, the sectors of valid data contained within the portion of the data region extending from the head sector to the tail sector; and
marking, in memory, each sector of the valid data in which data corruption was detected as invalid.

9. The method of claim 8, wherein the RAID metadata database further includes two stage sectors, wherein the stage sectors include a primary stage sector containing data not yet stored in the portion of the data region that stores valid data and a secondary stage sector containing data previously stored in the portion of the data region that stores valid data, and further comprising:
in response to the data corruption being in one of the two stage sectors, loading data into memory only from the other stage sector.

10. A data storage system comprising:
at least one storage processor including processing circuitry and a memory;
a plurality of non-volatile data storage drives communicably coupled to the storage processor; and
wherein the memory has program code stored thereon, wherein the program code, when executed by the processing circuitry, causes the processing circuitry to:
detect data corruption in a RAID (Redundant Array of Independent Disks) metadata database, wherein the RAID metadata database includes a data region and two super sectors, wherein the super sectors include a primary super sector containing a first set of pointers indicating valid data within the data region and a secondary super sector containing a second set of pointers indicating valid data within the data region, and
in response to the data corruption being in one of the two super sectors, use the set of pointers contained in the other super sector to identify a portion of the data region that stores valid data.

11. The data storage system of claim 10, wherein the program code, when executed by the processing circuitry, further causes the processing circuitry to:
in response to the data corruption being detected only in the secondary super sector, use the first set of pointers in the primary super sector to identify the portion of the data region that stores valid data.

12. The data storage system of claim 11, wherein the portion of the data region that stores valid data comprises a contiguous set of sectors within the data region extending from a head sector to a tail sector, and wherein the first set of pointers in the primary super sector comprises a logical block address of the head sector and a logical block address of the tail sector.

13. The data storage system of claim 10, wherein the program code, when executed by the processing circuitry, further causes the processing circuitry to:
in response to the data corruption being detected only in the primary super sector, use the second set of pointers in the secondary super sector to identify the portion of the data region that stores valid data.

14. The data storage system of claim 13, wherein the portion of the data region that stores valid data comprises a contiguous set of sectors within the data region extending from a head sector to a tail sector, and wherein the second set of pointers in the secondary super sector comprises a logical block address of the head sector and a logical block address of the tail sector.

15. The data storage system of claim 10, wherein the first set of pointers in the primary super sector comprises a most recent set of pointers indicating a most recent set of valid data within the data region; and
wherein the second set of pointers in the secondary super sector comprises a previous set of pointers indicating a previous set of valid data within the data region.

16. The data storage system of claim 10, wherein the portion of the data region storing valid data comprises a contiguous set of sectors within the data region extending from a head sector to a tail sector, and wherein the program code, when executed by the processing circuitry, further causes the processing circuitry to:
in response to detecting data corruption in both super sectors:
locate the head sector by searching the data region for a sector containing a magic number, wherein the sector containing the magic number is the head sector, and
locate the tail sector by traversing sectors of the data region located after the head sector until reaching a sector having a generation number smaller than a generation number contained in the head sector, wherein the sector containing the generation number smaller than the generation number contained in the head sector is the tail sector.

17. The data storage system of claim 16, wherein the program code, when executed by the processing circuitry, further causes the processing circuitry to, in response to detection of data corruption in at least one sector within the portion of the data region storing valid data:
load, into memory, the sectors of valid data contained within the portion of the data region extending from the head sector to the tail sector; and mark, in memory, each sector of the valid data in which data corruption was detected as invalid.

18. The data storage system of claim 17, wherein the RAID metadata database further includes two stage sectors, wherein the stage sectors include a primary stage sector containing data not yet stored in the portion of the data region that stores valid data and a secondary stage sector containing data previously stored in the portion of the data region that stores valid data, and wherein the program code, when executed by the processing circuitry, further causes the processing circuitry to:
   in response to the data corruption being in one of the two stage sectors, load data into memory only from the other stage sector.

19. A computer program product including a non-transitory computer readable medium having instructions stored thereon, wherein the instructions, when executed on processing circuitry, cause the processing circuitry to perform steps including:
   detecting data corruption in a RAID (Redundant Array of Independent Disks) metadata database, wherein the RAID metadata database includes a data region and two super sectors, wherein the super sectors include a primary super sector containing a first set of pointers indicating valid data within the data region and a secondary super sector containing a second set of pointers indicating valid data within the data region; and
   in response to the data corruption being in one of the two super sectors, using the set of pointers contained in the other super sector to identify a portion of the data region that stores valid data.

\* \* \* \* \*